March 15, 1938.  P. GARDNER ET AL  2,110,856
BIAS CUTTING AND WIND-UP APPARATUS
Filed Feb. 1, 1936   2 Sheets-Sheet 2
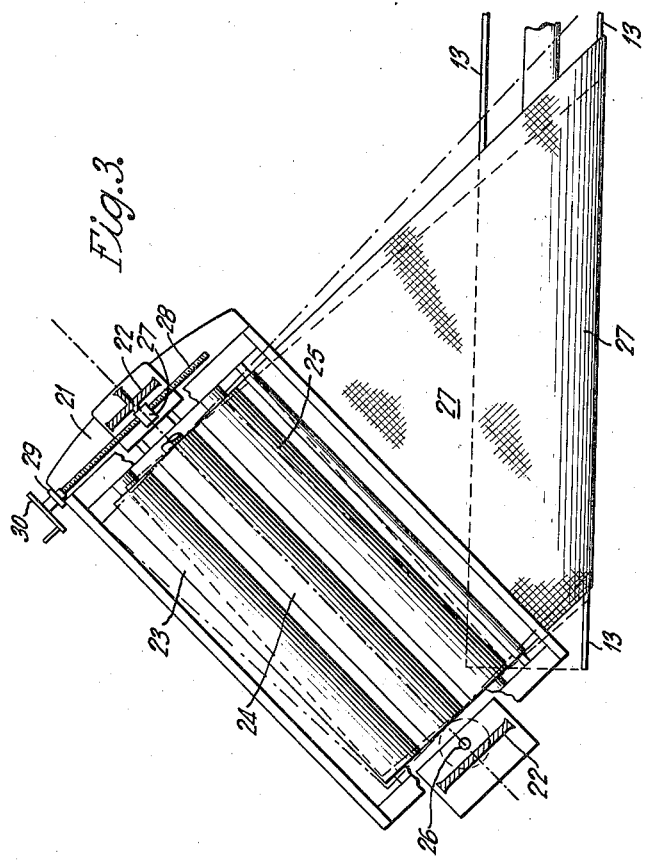
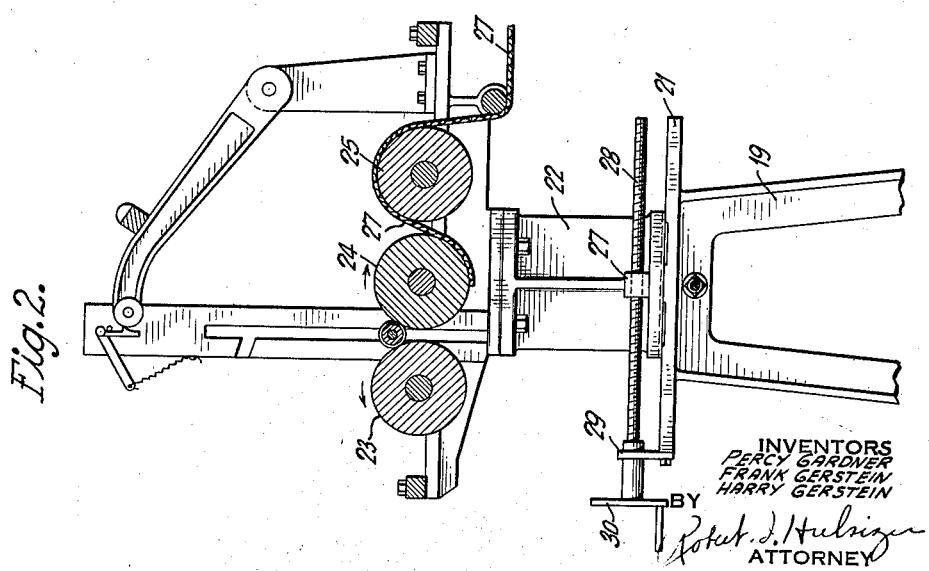
INVENTORS
PERCY GARDNER
FRANK GERSTEIN
HARRY GERSTEIN
BY
ATTORNEY Patented Mar. 15, 1938

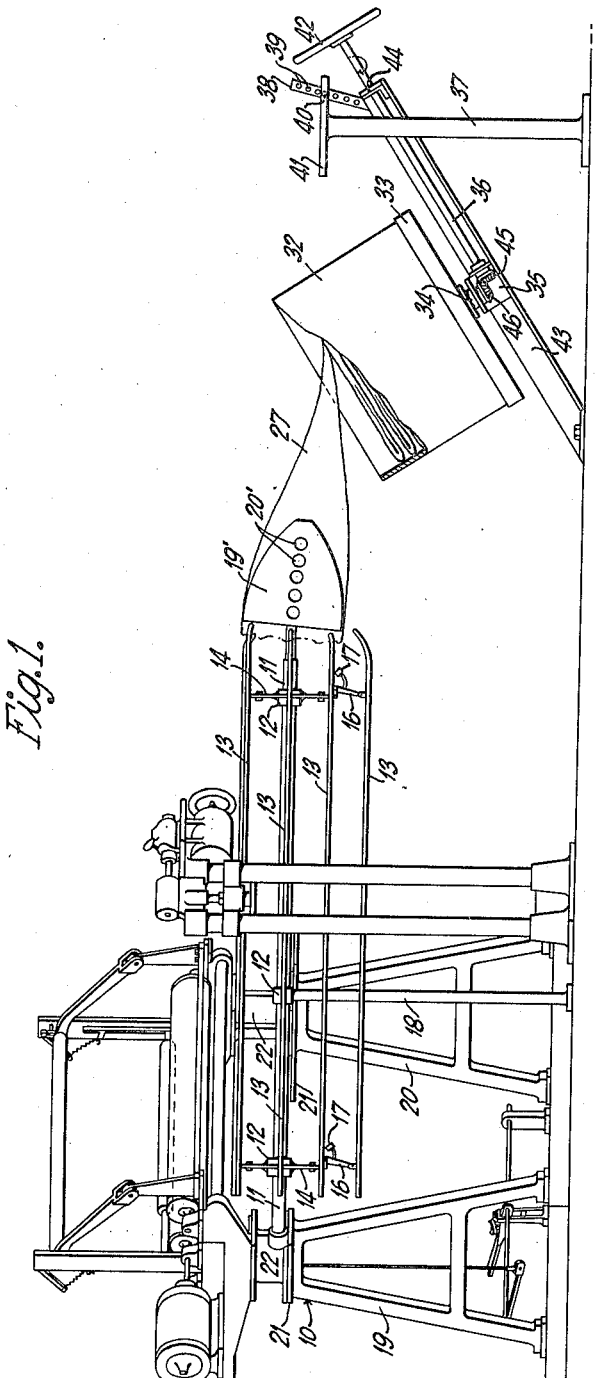

2,110,856

UNITED STATES PATENT OFFICE 2,110,856

BIAS CUTTING AND WIND-UP APPARATUS

Percy Gardner, East Orange, N. J., and Frank Gerstein and Harry Gerstein, New York, N. Y., assignors to Lever Bias Machine Corporation, New York, N. Y., a corporation of New York Application February 1, 1936, Serial No. 61,908

5 Claims. (Cl. 164—65)

This invention relates to machines for cutting material on the bias and has particular reference to a machine in which the tubular material is drawn off a rotatable support over a mandrel in a spiral direction and pulled off of and advanced over the mandrel by a device which simultaneously winds up the material, and a knife cutting the material on the bias as it passes over the mandrel.

The main object of the invention is to provide readily operable means whereby the wind-up device may be adjusted whereby its angle with respect to the mandrel may be varied at will.

A further object is to combine with the adjustment of the wind-up device, means whereby the material may pass from a support to the mandrel with a minimum of resistance whereby a minimum pull is required of the wind-up device to pull the material through the machine.

Further and more specific objects, features, and advantages will more clearly appear from a consideration of the specification hereinafter when taken in connection with the accompanying drawings which form part of the specification and which illustrate a present preferred form which the invention may assume.

Briefly considered and in general terms the invention comprises a combination of the following elements:

1. A mandrel provided with a plurality of material engaging bars some of which are more or less permanently adjustable to define the general tubular diameter of the mandrel and at least one of which is automatically adjusted by gravity action and contact pressure with the material passing over the mandrel to maintain the tubular goods in a steady state of tension as it passes over the mandrel.

2. A freely rotatable support for the material before it goes on the mandrel, in the form of a platform preferably turned by hand and adapted to receive an open faced container such as a box or case containing the material therein disposed loosely therein in loose folds as it has dropped therein from the sewing machines which have sewed the material into the tubular form, prior to its being passed onto the mandrel to be cut on the bias.

3. A wind-up and pull-off apparatus which is disposed to pull the material across and over the mandrel in a spiral manner and off the mandrel between suitable rollers onto a cored roll upon which the material is wound up with a practically perfect lateral edge which eliminates the necessity of shaving the ends after the winding is completed and thus saves a large amount of material and labor and time.

4. A simple device whereby the wind-up rollers are pivotally mounted on a frame which is associated with means such as screw means whereby the end of the frame may be swung to change the angle which the wind-up device makes with the axis of the mandrel so that the width of the cloth being cut can be thus very quickly and easily changed at will.

It is to be noted that the only means for moving the material through the apparatus is the pull exerted thereon by the wind-up mechanism. It will also be noted that the weight of the material being wound up is the very pressure which creates the necessary tension in the goods to not only wind it up but also to pull it over and off the mandrel. While all this is taking place it is absolutely essential that the pulling tension be absolutely even and regular and as steady as possible and as small as possible because any variation in the tension in the goods will cause it to be cut unevenly and also to wind up unevenly thereby necessitating costly and wasteful shaving of the ends of the wound roll.

With the features above enumerated adopted into the improved machine it is found that the goods can be wound up faster, with a minimum strain thereon, and with a wound edge which practically eliminates shaving of the ends. Furthermore it will be obvious that when the material on the rotatable support is in rolled up condition and has to be pulled off a heavy roll onto the mandrel, there is a decided limit to the size of roll which can thus be handled whereas when the material drops from the swing machine loosely into a box or container which is then placed on the rotary platform to be associated with the machine, the material can then be pulled out of the box with practically no effort or strain on the wind-up device and therefore the length of material which can be thus handled is only limited by the capacity of the box or container. It has been found that much greater lengths of material can be handled in this way with even less effort or strain on the pulling mechanism. The wind-up rollers are mounted on a frame which is pivotally mounted on a bed-plate, and one end of the frame is provided with a screw mechanism which is associated with the bed plate so that when operated the end of the frame can be swung around to change the angle between the wind-up rollers and the axis of the mandrel. Since the wind-up rollers pull the material all the way through the apparatus it will be seen that if the angle of pull is changed then the width of the material being cut is also changed merely by turning a screw on the wind-up and this can be done, if desired, even while the material is being wound up.

The present preferred form which the invention may assume is illustrated in the accompanying drawings of which Fig. 1 is a general side elevation of the entire machine;

Fig. 2 is a vertical cross section through the wind-up device showing the means of adjustment;

Fig. 3 is a partial plan view of the mandrel and the wind-up device.

In the drawings, the present preferred form which the invention may assume, comprises a pedestal 10 from which a shaft 11 extends horizontally. This shaft supports a plurality of spider plates 12 on the periphery of which a plurality of longitudinally extending bars 13 are mounted to form the outline of a mandrel over which material is to be advanced. Some of these bars are more or less permanently adjustable to desired positions by means of being supported on arms 14 which slide in the spider frames 12 and are adjusted by means suitable for that purpose. One of these mandrel arms, preferably the lowest one, is supported from arms 14 by means of a pivot arm 16 counterbalanced by a gravity operated counterweight 17 which tends to keep the bar in its lowest or outermost position at all times. This will cause a steady even pressure on the material which is spirally passing over the mandrel and therefore will exert a constant tension on it and therefore tend to keep it passing over the mandrel in a perfectly even state of tension and practically constant diameter. At a point where the goods leave the mandrel to pass to the wind-up device the shaft 11 may be suitably supported by an auxiliary pedestal 18.

The wind-up device is mounted on pedestals 19 and 20 which support the bed plate 21 thereon. On this bed plate is supported rollers 23, 24, and 25 which form essential parts of the wind-up device. The frame 22 supporting the rollers and the wind-up apparatus is pivoted at 26 to the bed plate 21 and at the other end is provided with an apertured threaded lug 27 through which passes a screw 28 journalled loosely in a slotted flange 29 fastened to the bed plate 21. The loose engagement of screw 28 in slotted flange 29 permits slight necessary angular changes in the position of the screw shaft 28 as the frame 22 swings. The handle 30 permits the screw to be rotated and thus to swing the end of the frame 22 in either direction whereby its angle with respect to the axis of the mandrel can be quickly and easily adjusted and, if desired, even while the machine is running. In most cases however, it is desired before the cutting starts to cut and wind a given length of material at a specified width and the frame 22 is set at the position to give that width before the cutting and winding operation begins. A scale (not shown) may be applied to be calibrated in terms of material widths for the different positions of the frame 22.

In Fig. 1 is shown a rotatable platform such as 33 adapted to receive a box or other container 32 in which is loosely disposed the material 27 in loose folds as it has been received therein as it drops from the sewing machine making it into tubular form. The platform 33 is supported on a shaft 34 journalled on plate 35 also journalling a shaft 36. The plate 35 is fastened to a beam 43 fastened loosely at one end to the floor and at the other end to a pedestal or upright member 37 by means of adjustable apertured link 38 one end of which is fastened to the beam 43 and the other end of which through the holes 38 is connected adjustably to a pin 40 on the top of pedestal 37, as at plate 41. A hand wheel 42 is connected to the outer end of the shaft 36 and turns the same. The outer end of the shaft 36 is journalled in flange plate 44. The opposite end of the shaft 36 has a bevel gear 45 thereon meshing with a bevel gear 46 on the stub shaft 34.

In general operation, therefore, we will assume that an order has been received to cut a given length of goods on the bias at a definite width. The frame 22 is then set for that width of cut and the material in tubular form has been sewed and dropped loosely folded into the container or box 32. The container is fastened to the platform 33 and enough material is pulled out to extend over the mandrel and to and between the wind up rollers. Then the motor is started and the wind up device pulls the material across and over the mandrel and winds it up at the given width. All this time an operator stands at the hand wheel 42 and turns it slowly in synchronous manner with the movement of the material spirally across the mandrel. The material being loosely folded and disposed in the box 32 will be drawn out of it with an absolute minimum of resistance so that the pulling of the goods through the machine occurs with the minimum disturbance to the tension maintained in the goods by the pull off device and by the automatically expansible mandrel.

While the invention has been described in detail and with respect to a present preferred form thereof which it may assume, it is not to be limited to such details and forms since many changes and modifications may be made in the invention without departing from the spirit and scope of the invention in its broadest aspects. Hence, it is desired to cover any and all forms and modifications of the invention which may come within the language or scope of any one or more of the appended claims.

What we claim, is:—

1. A bias cutting machine which comprises a mandrel and means thereon to automatically maintain the material passing thereover under constant tension, a wind-up device including rollers engaging the material being wound, said material resting on said rollers and the weight of said material being the only means in the wind-up device whereby tension is created in the material to pull it across and over the mandrel, said wind-up rollers mounted on a frame and means for adjusting the angle of the wind-up rollers on the frame whereby the angle of the rollers with respect to the mandrel may be varied to alter the width of the material being cut on the bias.

2. A bias cutting machine which comprises a mandrel and means thereon to automatically maintain the material passing thereover under constant tension, a wind-up device including rollers engaging the material being wound, said material resting on said rollers and the weight of the material being the only means in the wind-up device whereby tension is created in the material to pull it across and over the mandrel, said wind-up rollers mounted on a frame and means for adjusting the angle of the wind-up rollers on the frame whereby the angle of the rollers with respect to the mandrel may be varied to alter the width of the material being cut on the bias, a freely rotatable container near one end of the mandrel, whereby material disposed therein in a loosely folded untwisted condition may be pulled therefrom over the mandrel with a minimum of resistance.

3. In combination in a bias cutting machine, a mandrel having means to maintain the material thereon automatically in a constant state of tension, a wind-up device disposed at an angle to the mandrel, means in the wind-up device constituting the only means in the machine to pull the material across the mandrel, and means to adjust the angle of the wind-up device at will with respect to the mandrel.

4. In combination in a bias cutting machine, a mandrel having means to maintain the material thereon automatically in a constant state of tension, a wind-up device disposed at an angle to the mandrel, means in the wind-up device constituting the only means in the machine to pull the material across the mandrel, means to adjust the angle of the wind-up device at will with respect to the mandrel, and a rotary inclined support for the material at the other end of the mandrel, said support adapted to receive a container to be removably disposed thereon and having therein tubular material in loosely folded untwisted condition to be passed on to the mandrel.

5. In combination in a bias cutting machine, an inclined rotary support, a container thereon having therein material in tubular loosely folded untwisted condition, a mandrel to receive said material, means on the mandrel to maintain the material in a constant state of tension, and a wind-up device to pull the material from the container and across the mandrel and wind it up, and means to at will adjust the angle between the wind-up device and the mandrel.

PERCY GARDNER.
FRANK GERSTEIN.
HARRY GERSTEIN.